US006966190B2

(12) United States Patent
Wylie

(10) Patent No.: US 6,966,190 B2
(45) Date of Patent: Nov. 22, 2005

(54) COMBINED CYCLE FOR GENERATING ELECTRIC POWER

(75) Inventor: Roger Wylie, Marble Falls, TX (US)

(73) Assignee: Wylie Inentions Co., Inc., Marble Falls, TX (US)

( * ) Notice: Subject to any disclaimer, the term of this patent is extended or adjusted under 35 U.S.C. 154(b) by 0 days.

(21) Appl. No.: 10/434,244

(22) Filed: May 8, 2003

(65) Prior Publication Data

US 2004/0221583 A1    Nov. 11, 2004

(51) Int. Cl.[7] .............................. F02C 3/28; F02C 6/02; F02C 6/18
(52) U.S. Cl. ........................ 60/780; 60/781; 60/39.12; 60/39.182
(58) Field of Search .................. 60/774, 780, 781, 60/39.12, 39.182

(56) References Cited

U.S. PATENT DOCUMENTS

| | | | | |
|---|---|---|---|---|
| 4,288,979 A | * | 9/1981 | Liljedahl et al. ............ | 60/39.12 |
| 4,387,560 A | * | 6/1983 | Hamilton et al. ......... | 60/39.182 |
| 4,425,757 A | * | 1/1984 | Heyn et al. ............... | 60/39.182 |
| 5,174,107 A | * | 12/1992 | Ogawa et al. ............. | 60/39.12 |
| 5,388,395 A | * | 2/1995 | Scharpf et al. ............... | 60/781 |
| 5,649,416 A | * | 7/1997 | Moore ...................... | 60/39.182 |
| 5,865,023 A | * | 2/1999 | Sorensen et al. ........... | 60/39.12 |
| 6,101,983 A | * | 8/2000 | Anand et al. ............... | 60/39.12 |
| 6,141,955 A | * | 11/2000 | Akiyama et al. ........... | 60/39.15 |
| 6,167,692 B1 | * | 1/2001 | Anand et al. ............. | 60/39.182 |
| 6,237,320 B1 | * | 5/2001 | Stats et al. ..................... | 60/780 |

* cited by examiner

Primary Examiner—Ted Kim

(57) ABSTRACT

A combined cycle process that includes gas turbines, a steam turbine train, a heat recovery unit, and a gasification unit that produces low or mid BTU fuel gas from coal, lignite, coke, biomass, or other suitable hydrocarbon containing material wherein the fuel gas is burned in the heat recovery unit at one or more points to increase steam rate to the steam turbine train.

The fuel gas injection flow rates into the heat recovery unit are controlled to avoid exceeding peak temperatures in the heat recovery unit of about 2500 F.

Optionally, the fuel gas from the gasification unit is cooled by transferring sensible heat to condensate from the steam turbine train to convert the condensate to high pressure steam for driving the steam turbine train.

Optionally, a steam boiler unit is integrated into the combined cycle process to raise additional high pressure steam for the steam turbine train. The steam boiler feed water is condensate from the steam turbine train. The steam boiler produces saturated high pressure steam that is superheated in the heat recovery unit.

16 Claims, 4 Drawing Sheets

COMBINED CYCLE FOR GENERATING ELECTRIC POWER

FIELD OF THE INVENTION

This invention relates to generation of electric power with combined cycle power plants.

BACKGROUND OF THE INVENTION

Combined cycle systems are comprised of:
1) One or more gas turbines each driving an electric power generator;
2) A steam turbine train comprised of steam driven turning a common drive shaft that drives an electric power generator; and
3) A heat recovery unit in which heat in the combined gas turbine combustion exhaust gas stream is transferred to the steam turbine condensate to raise steam for the steam turbine train.

Optionally, a conventional steam boiler unit can be included in the complex to produce additional high pressure steam to increase power output from the steam turbine train. The condensate recycle system for the steam boiler and the heat recovery unit are integrated.

Modern combined cycle units fire fuel gas in the heat recovery unit to supplement the sensible heat transferred from the gas turbine exhaust gas streams to the steam turbine train working fluid. This feature is termed supplemental fuel gas firing. The additional heat released by supplemental fuel gas firing is used to increase steam generated in the heat recovery unit to increase power output from the steam turbine train.

Fuel gas for supplemental firing is injected directly into the gas turbine combustion exhaust gas stream in the heat recovery unit. The gas turbine exhaust gas streams contain sufficient residual unburned oxygen to support combustion of the fuel gas in the heat recovery unit.

The fuel to power efficiency of the incremental power generated by supplemental firing is less than for fuel gas fired to drive the gas turbines. Accordingly, supplemental firing is usually practiced to make incremental power during periods of peak power demand, when power prices are high. Also, supplemental firing is used when sensible heat available from the gas turbine exhaust gas stream is not adequate to raise all the steam required for the steam turbine train.

The fuel gas commonly used for supplemental firing is natural gas. Natural gas is the fuel of choice for gas turbines and therefore is already delivered on site.

Commercially available processes exist that convert a broad range of low cost solid hydrocarbon bearing materials to low BTU gas (100 to 150 BTU heating value per 1000 SCF) and mid BTU gas (300 to 400 BTU heating value per 1000 SCF heating value). Low and mid BTU gas is comprised of hydrogen, carbon monoxide, carbon dioxide, methane, nitrogen, and water. Materials that can be gasified to make low and mid BTU gas include bituminous and sub-bituminous coals, lignite, petroleum cokes, and bio-mass materials. Typical gasification processes for making fuel gas from coal are described in Chapter 6 of the *Handbook of Refining Processes* published by McGraw-Hill in 1996 (edited by Robert A. Meyers) and are incorporated herein by reference. This reference teaches using low and mid BTU gas to fire the gas turbines in combined cycle power generator units.

Many petroleum refineries include continuous fluidized-bed thermal cracking units. These units thermally crack heavy crude fractions such as vacuum residuum, atmospheric residuum, tar sands bitumen, heavy whole crude, shale oil, and catalytic plant bottoms to produce coke naphtha and gas oils. The cracking units are integrated with coal gasification reactors that produce low BTU gas (120 to 140 BTU) per standard cubic foot lower heating value) from coke. One such commercial process is the ExxonMobil Flexicoking process that is described in described in Chapter 12 of the aforementioned *Handbook of Refining Processes* and is incorporated herein by reference. The reference teaches burning the low BTU gas produced in the Flexicoker in process heaters and boilers.

Coal, lignite, and coke usually contain sulfur compounds in varying amounts. The sulfur is converted to hydrogen sulfide and carbonyl sulfide during the gasification process. Sulfur in the product gas is undesirable because it is converted to sulfur oxides when the gas is burned and sulfur oxides are of course unacceptable air pollutants. Accordingly, to reduce the sulfur content of the product low BTU gas, a sulfur adsorbing compound such as limestone or dolomite can be added to the gasification reactor to absorb the sulfur. Limestone and dolomite typically reduce the sulfur content of the product gas to 300 to 600 ppm sulfur by weight Alternatively, the product low BTU gas can be treated to remove and recover residual sulfur and optionally also carbon dioxide in a suitable sulfur commercial recovery unit downstream of the gasification unit. The ExxonMobil Flexorb process, described in Chapter 12 of the aforementioned Handbook of Refining Processes and incorporated herein by reference, is a widely used commercially available sulfur adsorption process which can reduce the sulfur content of the product low BTU gas to below 10 ppm by weight.

Whereas is with conventional combined cycles the general practice is to fire natural gas in the heat recovery unit only during periods of high power demand to generate peak power when higher power prices can support the higher cost of supplemental power, the economics of the combined cycle of this invention favors continuous injection of low or mid BTU fuel gas produced with the gasifier unit to produce supplemental power continuously. This is because fuel gas produced with the gasifier is made from low cost materials with existing facilities and is therefore usually cheaper than natural gas. Also, it is cost effective and easier to operate a process unit such as the gasifier continuously rather than to start it up and shut it down on an erratic schedule.

SUMMARY OF THE INVENTION

The process of the present invention is a combined cycle that is integrated with a gasification unit that produces low or mid BTU fuel gas from coal, coke, lignite, bio-mass, or other raw material. The fuel gas is fired in the heat recovery unit of the combined cycle. The additional heat released in the heat recovery unit is used to increase steam raised in the heat recovery unit to generate incremental supplemental power with the steam turbine train. Optionally, the fuel gas produced in the gasification unit is cooled against condensate and converts the condensate to additional steam that is used to drive the steam turbine train to produce additional power.

The fuel gas is injected into the gas turbine exhaust gas stream flowing through the heat recovery unit at one or more points. The fuel gas stream rates are controlled to, maintain peak temperatures in the gas turbine exhaust gas stream near the fuel injection points below about 2500 F.

A conventional steam boiler unit fired with a fossil fuel e.g., coal, coke, natural gas, or nuclear powered, can be integrated with the combined cycle to provide additional steam for the steam turbine train to generate additional power.

The integration of the gasification plant with a combined cycle and the several heat integration concepts of the present invention, which are taught herein, reduce the cost and increase the fuel to power efficiency of the combined cycle; this will become evident as the invention is described.

DESCRIPTION OF THE INVENTION IN PREFERRED EMBODIMENTS

Figure 1:
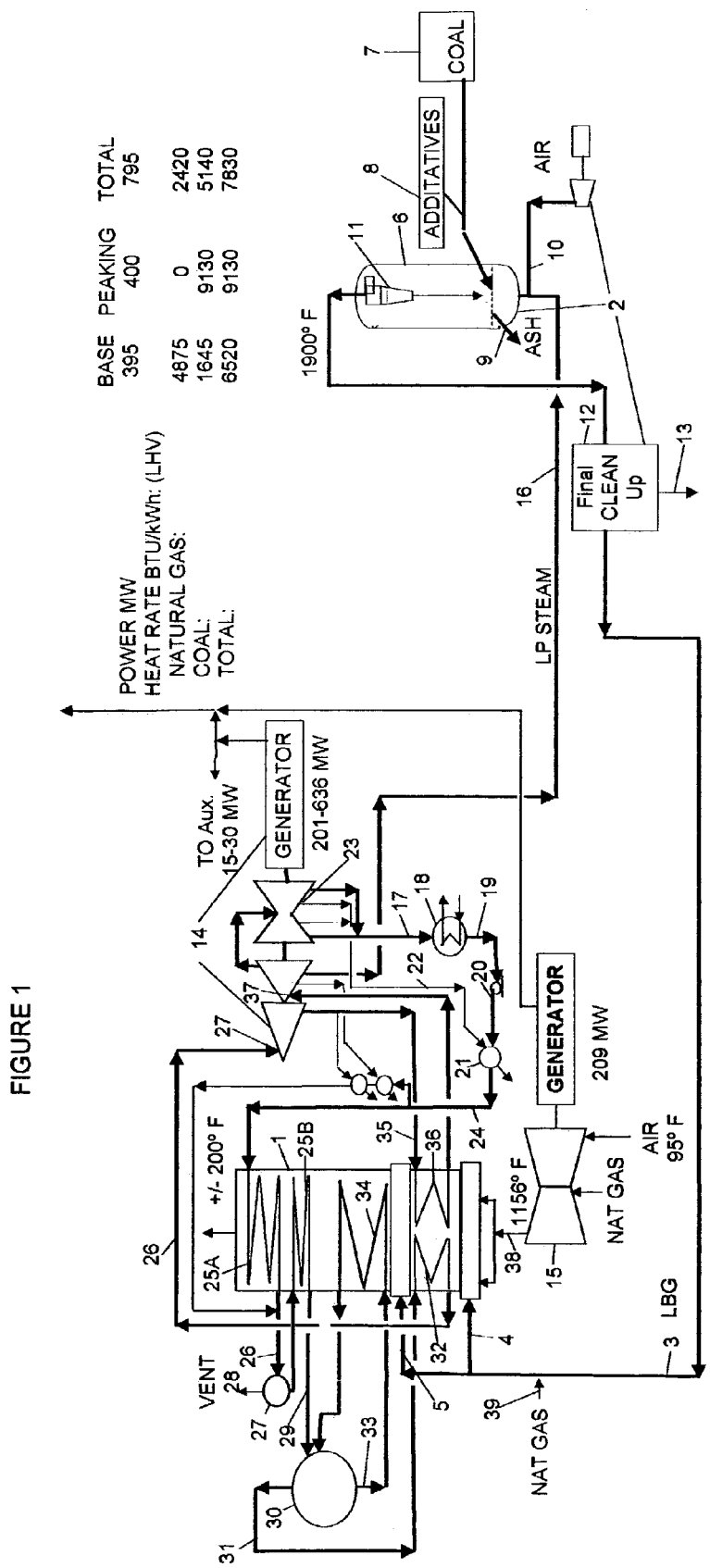
FIG. 1 is process flow diagram of a combined cycle wherein low BTU gas is produced in a coal gasification unit and fed directly to the heat recovery unit for supplemental firing. Limestone or dolomite is fed to the gasification reactor along with the feed coal to reduce product gas sulfur content.

FIG. 1 is simplified process flow diagram of an embodiment of the combined cycle system of the present invention in a preferred embodiment. Fuel gas is fired in the heat recovery unit 1. The fuel gas is low BTU fuel gas produced in a gasification unit 2. The low BTU gas is injected directly into the gas turbine exhaust gas stream 3 flowing through the heat recovery unit at two points 4, 5. Firing of low BTU gas in the heat recovery unit provides heat in addition to sensible heat transferred from the gas turbine exhaust gas to condensate. The additional heat is used to increase the condensate recycle rate, raising additional steam that generates additional electric power with the steam turbine train 14.

The gasification reactor 6 is a refractory-lined fluidized bed that operates at between about 20 to 60 psig and about 1800 F to 2200 F. The feed stock for gasification in this example is run of the mine coal 7. The coal is granulated, sized, and conveyed to a lock hopper system where it is pressurized, discharged through a rotary feeder, and pneumatically transported by air or process gas (not shown) to the gasification reactor.

The coal contains sulfur compounds. Accordingly, granulated limestone or dolomite is fed into the reactor 8 along with the coal to adsorb sulfur released by the coal as it is gasified. Ash and spent limestone or dolomite are continuously removed from the gasification fluid bed 9. Air 10 and steam streams 16 are fed into the bottom of the fluid bed.

The gasification reactor includes cyclones 11 to elutriate fine solids from the product low BTU gas. Hot product low BTU fuel gas from the cyclones is passed through ceramic filters 12 to remove residual solid fines 13 in final cleanup.

The process includes a steam turbine train 14, several gas turbines 15, each fired with natural gas. Exhaust steam from the steam turbine train 17 is condensed in the condenser 18. The condensate stream 19 is pumped with condensate pump 20 through the condensate preheater 21 where it is heated to about 180 F using a steam stream 22 extracted from the steam turbine train 23.

The preheated condensate stream 24 is conveyed to the economizer section 25A in the heat recovery unit 1. Here the condensate stream begins its traverse through the heat recovery unit 1 to be converted to high pressure superheated steam 26 that is fed into the upstream inlet 27 of the steam turbine train 14.

From the economizer section 25A in the heat recovery unit 1 the condensate stream 26 is diverted to the vent drum 27 where air that has leaked into condensate system is expelled from the top of the drum 28. The effluent condensate 29 from the economizer section 25B is conveyed to a steam drum 30. The steam drum 30 separates the condensate into a steam stream 31 that is piped into the hot super heating tubes 32 in the heat recovery unit 1 and a condensate stream 33 that is conveyed to the primary heating tubes 34 in the heat recovery unit 1.

A steam side stream 35 is extracted from the steam turbine train to be reheated in reheat tubes 36 in the heat recovery unit and fed back into the steam turbine train at a downstream point 37.

The gas turbine combustion exhaust gas streams 38 are combined and conveyed to the gas inlet of the heat recovery unit 1. In the heat recovery unit the combined turbine exhaust gas stream gives up sensible heat to boil the condensate stream and reheat the extracted steam stream.

Low BTU gas exits 3 the gasification unit 2 at about 2000 F after final cleanup. The low BTU gas stream is divided into two streams that are dispersed with gas nozzles into the gas turbine combustion exhaust gas stream at two points 4, 5. Facilities are also provided to inject natural gas 39 into the heat recovery unit 1 in case the low BTU gas supply is temporarily interrupted or inadequate.

Figure 2:
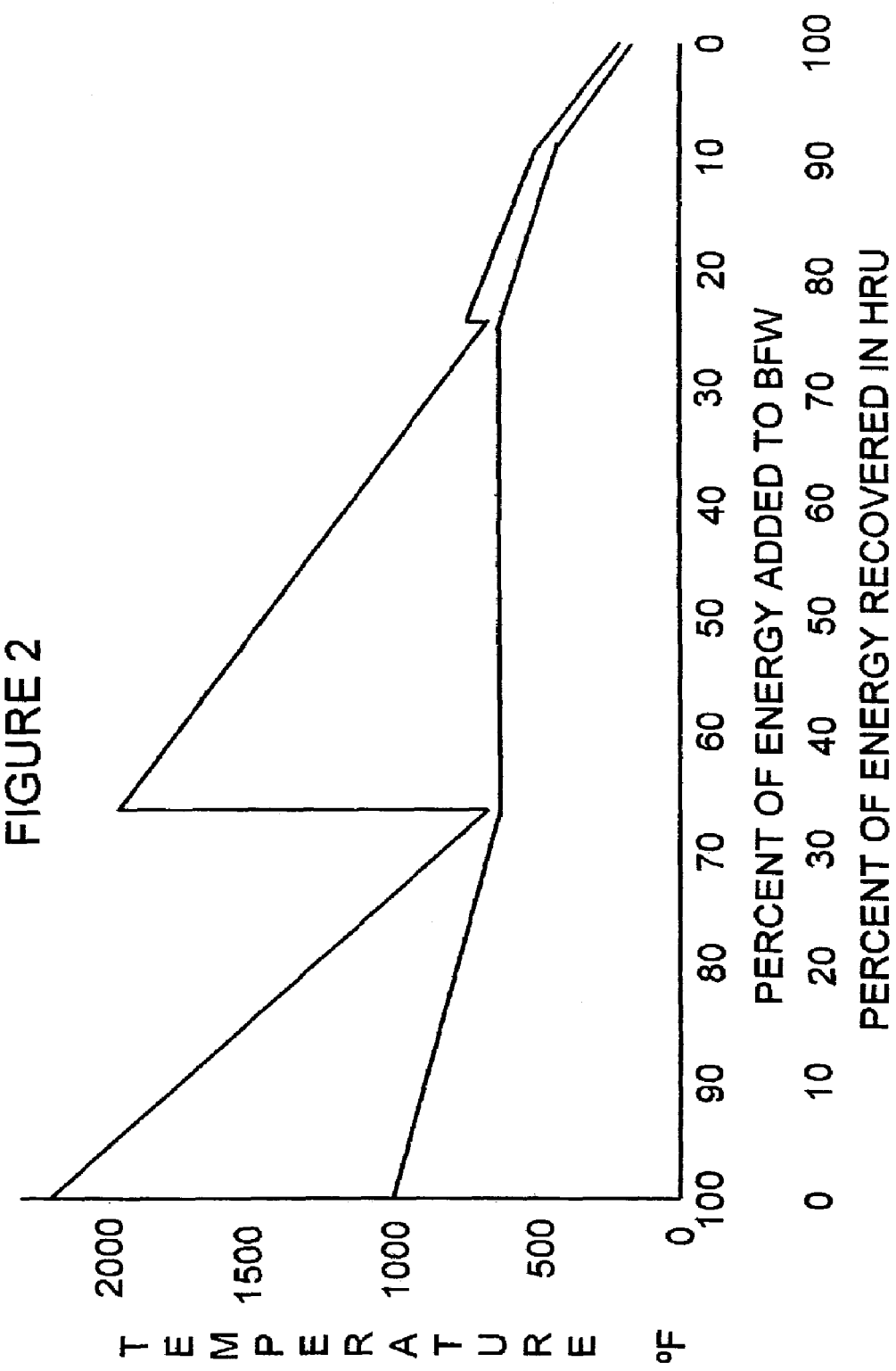
FIG. 2 is graph of a typical gas turbine cooling curve and condensate heating curve in a heat recovery unit of the present process. Low BTU fuel gas is injected into the turbine exhaust gas stream in the heat recovery unit at three points.

The low BTU gas injection stream rates are controlled to limit peak temperatures in the gas turbine exhaust gas stream flowing through the heat recovery unit near the gas injection points to below about 2500 F. (Below about 2500 F mechanical damage to the heat recovery unit internals is unlikely and NOX air pollutants are not generated.) This is schematically exemplified in FIG. 2 which is a graph of gas turbine exhaust gas stream temperature vs. percentage of sensible heat transferred from the turbine gas to the condensate stream in a heat recovery unit for a typical combined cycle. Also shown in FIG. 2 is the temperature vs. percentage of heat transferred curve for the condensate stream Location of fuel gas injection points in the heat recovery unit is arbitrary. FIG. 2 is an example that shows three low BTU fuel gas injection points selected so that the first fuel gas firing point provides supplemental heat to super heat steam. The second firing point provides supplemental heat to vaporize condensate. The third firing point provides supplemental heat to preheat condensate in the economizer section of the heat recovery unit.

Figure 3:
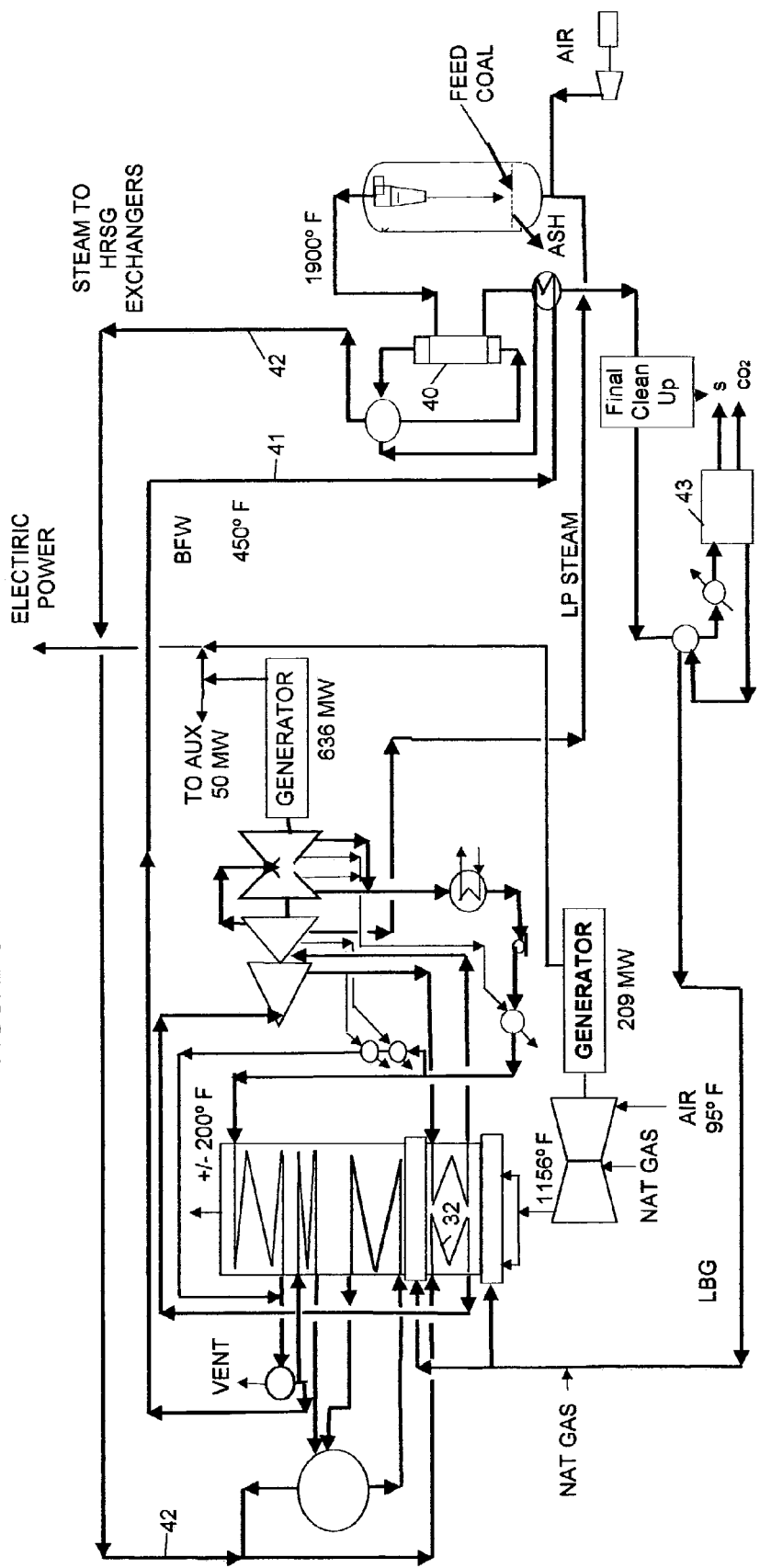
FIG. 3 is a process flow diagram of a combined cycle wherein low BTU gas is produced in a coal gasification unit and the fuel gas is cooled in a heat exchanger against condensate from the steam turbine train to convert the condensate to steam for the steam turbine train. The cooled product gas is treated in a desulfurization unit to remove sulfur and carbon dioxide.

FIG. 3 is a process flow plan of an embodiment of the combined cycle of this invention wherein the low BTU gas stream from the gasification unit which is at about 2000 F is cooled prior to injection into the heat recovery unit.

The hot low BTU gas product is cooled in a fuel gas cooler 40 by boiling a condensate stream 41 from the steam turbine train to form a saturated steam stream 42. The saturated steam stream 42 is conveyed to the superheat tubes 32 of the heat recovery unit, is superheated and then fed into the steam turbine train. Using the sensible heat in the fuel gas stream to raise steam for the steam turbine increases the overall fuel efficiency of power plant.

The fuel gas cooler 40 shown in FIG. 3 is a thermosyphon type of heat exchanger system that is preferred for this fuel gas product cooler application.

The coal gasified in the gasification unit contains sulfur. However, in the process of FIG. 3 no limestone dolomite other sulfur adsorbant is fed to the gasifier reactor to adsorb sulfur. Instead, the cooled product gas stream is treated in a sulfur removal unit 43 that removes and recovers sulfur, and optionally, carbon dioxide.

Figure 4:
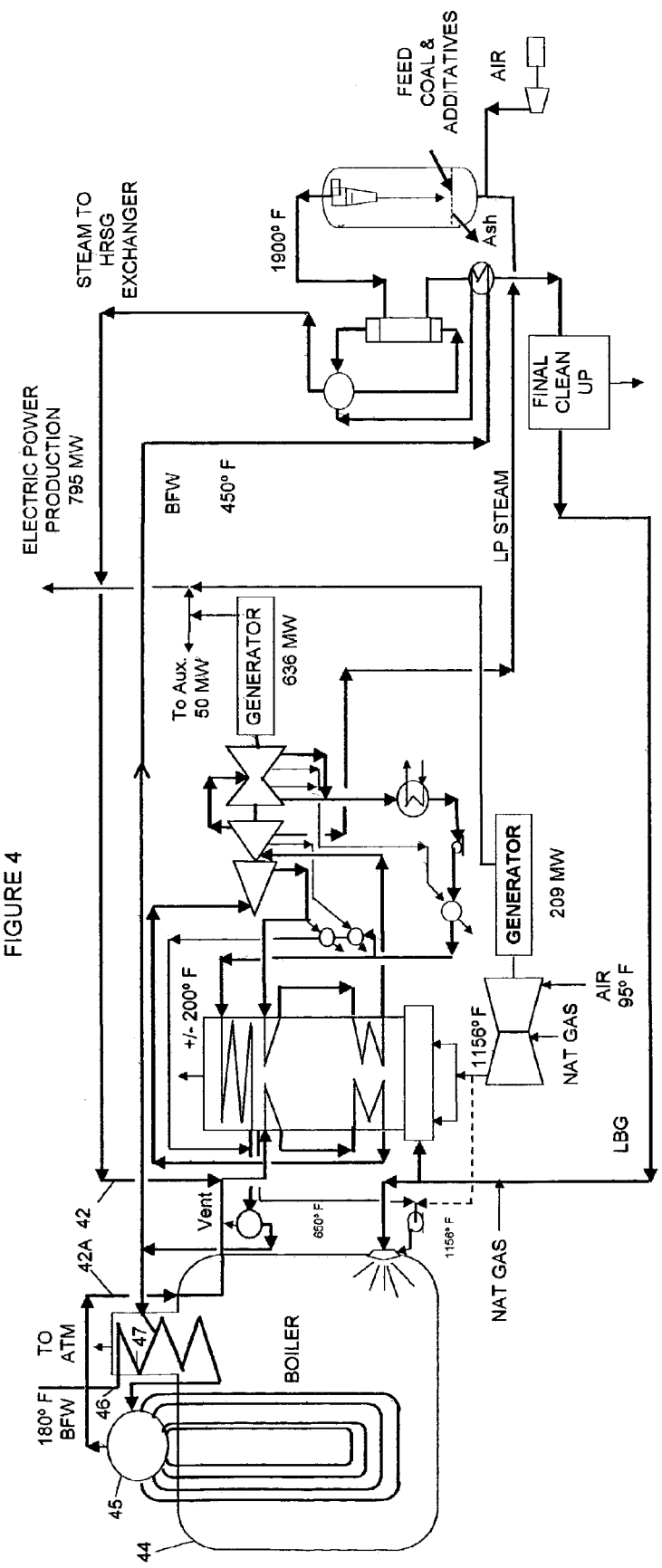
FIG. 4 is a process flow diagram of the combined cycle of the present invention that includes a conventional steam boiler unit that raises additional high pressure steam for the steam turbine train.

FIG. 4 is a simplified process flow diagram of an embodiment of the process of this invention that includes a conventional steam boiler unit 44. The steam boiler raises additional saturated high pressure steam 42A for the steam turbine train to increase the power output of the steam turbine train. The process of FIG. 4 includes the fuel gas cooler 40 of FIG. 3. But the process including a steam boiler unit can be operated without the fuel gas cooler, with the hot fuel gas injected directly into the heat recovery unit 1 as shown in FIG. 1.

FIG. 4 shows a preferred method for integrating the steam boiler steam and condensate streams into the combined cycle process of this invention. The high pressure saturated steam stream 42A from the steam drum 45 of the steam boiler system 44 is piped into the super heating tubes of the heat recovery unit 32 where it is superheated along with saturated steam raised in the heat recovery unit 1. The boiler feed water for the steam boiler is a condensate stream 46 from the condenser that is conveyed into the economizer tubes 47 of the steam boiler unit 44.

I claim:

1. A combined cycle process for generating electric power that includes: 1) a steam turbine train comprised of one or more steam turbines in series that has an upstream high pressure steam inlet and a downstream exhaust steam outlet, and that drives an electric generator, 2) two or more gas turbines in parallel that each drive an electric generator, 3) a heat recovery unit, and 4) a gasification plant that produces a fuel gas stream selected from low BTU gas and mid BTU gas from a hydrocarbon containing material, the combined cycle process comprising the steps of:
    a. firing fuel gas in the gas turbines to drive their electric generator to produce electric power and emit a gas turbine combustion exhaust gas stream from the fired gas turbines;
    b. feeding a high pressure superheated steam stream to the upstream steam inlet to the steam turbine train and withdrawing a low pressure steam stream from the downstream steam outlet on the steam turbine train to produce electric power with the steam turbine train generator;
    c. condensing the low pressure steam stream from the steam turbine train to form a condensate stream;
    d. conveying the condensate stream to the heat recovery unit wherein the condensate stream is heated to form the high pressure super heated steam stream that is fed into the upstream steam inlet of the steam turbine train;
    e. combining the gas turbine exhaust gas streams and conveying the combined gas turbine combustion exhaust gas stream to the heat recovery unit wherein sensible heat is transferred from the combined gas turbine combustion gas stream to the condensate stream to convert the condensate stream to the high pressure superheated steam stream that is fed into the high pressure steam inlet to the steam turbine train;
    f. injecting the fuel gas that is produced in the gasification unit into the gas turbine combustion exhaust gas stream flowing through the heat recovery unit at a plurality of points spaced along the direction of flow of the combustion exhaust gas stream in the heat recovery unit.

2. The process of claim 1 wherein the hydrocarbon containing material that is gasified in the gasifier to make the fuel gas is selected from among coal, lignite, coke, and bio-mass.

3. The process of claim 1 wherein the fuel gas that is fed into the heat recovery unit is produced in a coke gasifier integrated into a fluidized-bed thermal cracking process.

4. The process of claim 1 wherein a sulfur adsorbing solid material is fed into the gasification unit along with the hydrocarbon containing material that is gasified.

5. The process of claim 4 wherein the sulfur adsorbing material is selected from limestone and dolomite.

6. The process of claim 1 wherein the stream flow rates of the fuel gas streams injected into the gas turbine combustion exhaust gas stream flowing through the heat recovery unit are controlled so that the temperature of the gas turbine combustion exhaust gas stream does not exceed about 2500 degrees F.

7. The process of claim 1 that includes the additional steps of extracting a steam side stream from a point on the steam turbine train, reheating that extracted steam side stream in the heat recovery unit, and feeding the reheated steam side stream back into the steam turbine train at a point downstream of the point from which the steam side stream was extracted.

8. The process of claim 1 that includes a steam boiler unit that converts condensate to high pressure steam that is superheated and fed into the steam turbine train.

9. A combined cycle process for generating electric power that includes: 1) a steam turbine train comprised of one or more steam turbines that has an upstream high pressure steam inlet and a downstream exhaust steam outlet, and that drives an electric generator, 2) two or more gas turbines each driving an electric generator and each emitting a gas turbine exhaust gas stream, 3) a heat recovery unit, 4) a gasification plant that produces fuel gas selected from a low BTU gas and a mid BTU gas from a hydrocarbon containing material, and 5) a fuel gas cooler that cools the product fuel gas by raising steam from condensate extracted from the steam turbine train, the combined cycle process comprising the steps of:
    a. firing fuel gas in the gas turbines to drive their electric generators to produce electric power, emitting a turbine combustion exhaust gas stream from each of the fired gas turbines;
    b. feeding a high pressure superheated steam stream to the upstream steam inlet of a steam turbine train, and withdrawing an exhaust steam stream from the downstream steam outlet from the steam turbine train;
    c. condensing the exhaust steam stream to form a condensate stream;
    d. dividing the condensate stream into a condensate stream A and a condensate stream B and conveying condensate stream B to the heat recovery unit;
    e. producing fuel gas in the gasification unit and conveying the fuel gas into the fuel gas cooler wherein the fuel gas is cooled to form a cooled fuel gas stream;
    f. conveying condensate stream A to the product cooler wherein condensate stream A is converted to a steam stream that is conveyed to superheat tubes in the heat recovery unit, thereby cooling the fuel gas to form the cooled fuel gas stream;

g. combining the gas turbine combustion exhaust gas streams and conveying the combined gas turbine combustion exhaust gas stream to the heat recovery unit wherein sensible heat from the combined gas turbine combustion gas stream is transferred to the condensate stream B to convert the condensate stream B to high pressure super heated steam and to superheat the steam stream generated in the fuel gas cooler to form more high pressure super heated steam and combining the super heated high pressure steam streams to form the high pressure super heated steam that is fed into the upstream inlet to the steam turbine train as per step b;

h. injecting the cooled fuel gas stream from the fuel gas cooler into the gas turbine combustion exhaust gas stream flowing through the heat recovery unit at a plurality of points spaced along the direction of the flow of the combustion exhaust gas stream in the heat recovery unit.

10. The process of claim 9 wherein the hydrocarbon containing material that is gasified in the gasification unit to make the fuel gas is selected from among coal, lignite, coke, and bio-mass.

11. The process of claim 9 wherein a sulfur adsorbing material that is fed into the gasification unit along with the material that is gasified.

12. The process of claim 11 wherein the sulfur adsorbing material is selected from limestone and dolomite.

13. The process of claim 9 that includes the additional steps of extracting a steam side stream from the steam turbine train, reheating the steam side stream in the heat recovery unit, and feeding the reheated side stream into the steam turbine train at a point downstream of the extraction point.

14. The process of claim 9 that includes the additional step of treating the cooled fuel gas stream in a sulfur removal unit to remove sulfur compounds from the cooled fuel gas stream.

15. The process of claim 9 that includes a steam boiler unit that converts condensate to high pressure steam that is superheated in the heat recovery unit and fed into the steam turbine train.

16. The process of claim 9 wherein the fuel gas that is fed into the heat recovery unit is produced in a coke gasifier that is integrated into a fluidized-bed thermal cracking process.

* * * * *